(12) United States Patent
Krishnan et al.

(10) Patent No.: US 7,955,681 B2
(45) Date of Patent: Jun. 7, 2011

(54) OPTICAL ARTICLE HAVING A MATERIAL CAPABLE OF UNDERGOING A MORPHOLOGICAL TRANSFORMATION AS AN ANTI-THEFT FEATURE AND A SYSTEM AND METHOD FOR INHIBITING THEFT OF SAME

(75) Inventors: Kasiraman Krishnan, Clifton Park, NY (US); Marc Brian Wisnudel, Clifton Park, NY (US); Ben Purushotam Patel, Niskayuna, NY (US); Lifeng Zhang, Clifton Park, NY (US)

(73) Assignee: NBCUniversal Media, LLC, New York, NY (US)

( * ) Notice: Subject to any disclaimer, the term of this patent is extended or adjusted under 35 U.S.C. 154(b) by 1244 days.

(21) Appl. No.: 11/557,618

(22) Filed: Nov. 8, 2006

(65) Prior Publication Data

US 2007/0116920 A1    May 24, 2007

Related U.S. Application Data

(63) Continuation-in-part of application No. 11/286,279, filed on Nov. 21, 2005.

(51) Int. Cl.
*B32B 3/02*    (2006.01)

(52) U.S. Cl. .............. 428/64.4; 428/64.7; 428/65.1; 428/913; 369/284

(58) Field of Classification Search .......... 428/64.4, 428/64.8, 64.7, 65.1, 913; 369/284
See application file for complete search history.

(56) References Cited

U.S. PATENT DOCUMENTS

| | | | |
|---|---|---|---|
| 5,528,222 A * | 6/1996 | Moskowitz et al. | 340/572.7 |
| 5,815,484 A * | 9/1998 | Smith et al. | 369/275.1 |
| 6,601,764 B1 * | 8/2003 | Goodwin, III | 235/385 |
| 6,795,464 B2 | 9/2004 | Lawandy | |
| 7,653,919 B2 * | 1/2010 | Potyrailo et al. | 720/718 |
| 2002/0163479 A1 | 11/2002 | Lin et al. | |
| 2004/0022542 A1 | 2/2004 | Atkinson | |
| 2004/0054594 A1 | 3/2004 | Forster et al. | |
| 2005/0050343 A1 | 3/2005 | Selinfreund et al. | |
| 2005/0110978 A1 | 5/2005 | Potyrailo et al. | |

(Continued)

FOREIGN PATENT DOCUMENTS

| WO | WO 98/40930 | 9/1998 |
|---|---|---|
| WO | 2007059288 | 5/2007 |

OTHER PUBLICATIONS

U.S. Appl. No. 11/538,451, filed Oct. 4, 2006, Marc B. Wisndel et al., "Wirelessly-Powered Flexible Circuit".

(Continued)

*Primary Examiner* — Mark Ruthkosky
*Assistant Examiner* — Gerard T Higgins
(74) *Attorney, Agent, or Firm* — Fletcher Yoder

(57) ABSTRACT

An optical article configured to transform from a pre-activated state of functionality to an activated state of functionality is provided. The optical article includes an optical data layer for storing data, wherein the data is read from the optical data layer in an activated state of functionality, and a material capable of undergoing a morphological transformation being disposed on the optical data layer and adapted to irreversibly alter from a first morphology to a second morphology upon interaction with the external stimulus to alter the state of functionality of the optical article from a pre-activated state to the activated state.

25 Claims, 6 Drawing Sheets

U.S. PATENT DOCUMENTS

| | | | |
|---|---|---|---|
| 2005/0167510 A1 | 8/2005 | Potyrailo et al. | |
| 2006/0028924 A1 | 2/2006 | Atkinson | |
| 2006/0227696 A1 | 10/2006 | Smith et al. | |
| 2006/0234003 A1 | 10/2006 | Selinfreund | |
| 2007/0114366 A1* | 5/2007 | Wisnudel et al. | 250/221 |
| 2007/0115762 A1* | 5/2007 | Wisnudel et al. | 369/13.56 |
| 2007/0116920 A1 | 5/2007 | Krishnan et al. | |
| 2007/0116988 A1* | 5/2007 | Wisnudel et al. | 428/817 |
| 2007/0140072 A1* | 6/2007 | Agrawal et al. | 369/14 |
| 2007/0143774 A1* | 6/2007 | Agrawal et al. | 720/738 |
| 2008/0012430 A1* | 1/2008 | Peters et al. | 307/131 |
| 2008/0018886 A1* | 1/2008 | Wisnudel et al. | 356/237.1 |
| 2008/0019258 A1* | 1/2008 | Peters et al. | 369/275.1 |
| 2009/0036304 A1* | 2/2009 | Misner et al. | 503/201 |

OTHER PUBLICATIONS

Flory, P.J., "Principles of Polymer Chemistry", Cornell Univ Press; 1953, pp. 554-576.

Sperling, L.H., "Introduction to Physical Polymer Science", John Wiley &Sons Inc., 2nd edition; 1992, pp. 130-146.

Collins, P., "Equatorial Times No. 3", The Newsletter of the SPS 2000 Community Around the World, Dec. 1996. Available at http://www.spacefuture.com/power/equatorialtimes/3.shtml.

Hamley, I.W., "The Physics of Block Coploymers", Oxford Univ Press; 1999, pp. 25-32.

PCT Search Report, PCT/US2007/080153, April 8, 2008.

* cited by examiner

OPTICAL ARTICLE HAVING A MATERIAL CAPABLE OF UNDERGOING A MORPHOLOGICAL TRANSFORMATION AS AN ANTI-THEFT FEATURE AND A SYSTEM AND METHOD FOR INHIBITING THEFT OF SAME

The present patent application is a continuation-in-part application from U.S. patent application Ser. No. 11/286,279, filed Nov. 21, 2005, the disclosure of which is hereby incorporated by reference in its entirety.

BACKGROUND

The invention relates generally to optical articles. More particularly, the invention relates to employing a material capable of undergoing a morphological transformation as an anti-theft feature in an optical article and methods of making the same.

Shoplifting is a major problem for retail venues and especially for shopping malls, where it is relatively difficult to keep an eye on each customer while he/she shops or moves around in the store. Relatively small objects, such as CDs and DVDs are easy targets as they can be easily hidden and carried out of the store without getting noticed. Stores, as well as the entertainment industry, incur monetary losses because of such instances. Due to the sensitive nature of the information stored inside, this problem become more severe if the CDs or DVDs are stolen from places like offices.

Even though close circuit surveillance cameras may be located at such places, shoplifting or stealing still occurs. Consumable products sometimes are equipped with theft-deterrent packaging. For example, clothing, CDs, audio tapes, DVDs and other high-value items sometimes are packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items in store shelves and warehouses. Other theft-deterrent technologies currently used for optical discs include special hub caps for DVD packaging that lock down the DVD and prevent it from being removed from the packaging until the DVD is purchased. Similarly, "keepers" that are attached to the outside of the DVD packaging also prevent the opening of the packaging until the DVD is purchased. In some cases, retailers have resorted to storing merchandise in locked glass display cases. In other stores, the DVD cases on the shelves are empty, and the buyer receives the actual disc when the movie is purchased. Many of these approaches are unappealing in that they add an additional inconvenience to the buyer or store-owner or they are not as effective at preventing theft as desired. Optical articles, in particular, pose an additional problem in that they are very easy to remove from their packaging and the sensor/anti-theft tags may be removed easily.

SUMMARY

Figure 1:
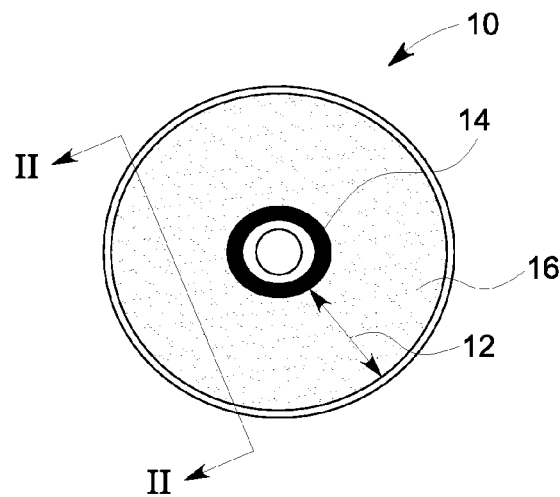
FIG. 1 is a schematic view of an optical article employing a material capable of undergoing a morphological transformation as an anti-theft feature, the optical article being in one of the two functionality states in accordance with an exemplary embodiment of the invention.

Embodiments of the invention are directed to an optical article having an anti-theft feature and a method for inhibiting theft of the same.

One exemplary embodiment of the invention is an optical article configured to transform from a pre-activated state of functionality to an activated state of functionality. The optical article includes an optical data layer for storing data, wherein the data is read from the optical data layer in an activated state of functionality. The optical article further includes a material capable of undergoing a morphological transformation being disposed on the optical data layer to irreversibly alter from a first morphology to a second morphology to alter the state of functionality of the optical article from a pre-activated state to the activated state.

Another exemplary embodiment of the invention is a method for selling an optical article. The method includes receiving an optical article, and conducting a monetary transaction at a first location.

Another exemplary embodiment of the invention is a method for altering functionality of an optical article from a pre-activated state to an activated state. The method includes providing the optical article having an optical data layer, and a material capable of undergoing a morphological transformation disposed on the optical data layer. The material capable of undergoing a morphological transformation includes a first morphology and a second morphology. The method further includes exposing the material capable of undergoing a morphological transformation with an external stimulus to irreversibly alter the material from the first morphology to the second morphology to alter the state of functionality of the optical article from a pre-activated state to the activated state.

These and other advantages and features will be more readily understood from the following detailed description of preferred embodiments of the invention that is provided in connection with the accompanying drawings.

DETAILED DESCRIPTION OF EXEMPLARY EMBODIMENTS

In certain embodiments, an optical article is configured to transform from a pre-activated state of functionality to an activated state of functionality. The optical article includes an optical data layer for storing data, where the data is read from the optical data layer in an activated state of functionality. A material capable of undergoing a morphological transformation having a first morphology and a second morphology is disposed on the data layer of the optical article. As used herein, the term "material capable of undergoing a morphological transformation" refers to a material or a combination of two or more materials that may transform from one morphology to another morphology. The transformation from one morphology to another may include a phase change or phase transformation, a phase separation, or a phase mixing. Further, both physical and chemical changes may be included in the transformation. Non-limiting examples of phase transformation may include transformations from crystalline to amorphous phases; transformations from ordered to disordered states; transformations from rubbery to glassy phases; transformations from immiscibility to miscibility of two or more materials; and transformations from immiscibility to miscibility of a material and a solvent, to name a few. The term also includes the above-mentioned transformations in the reverse directions. For example, the transformations may include amorphous to crystalline transformations, or disordered to ordered state transformations. "Phase separation" implies the separation of a single phase multicomponent material into constituent phases, where the multicomponent material may include two or more materials and may also include a solvent.

In one embodiment, the material capable of undergoing a morphological transformation may be disposed on the optical data layer. As used herein, the term "disposed on" embodies instances where the material capable of undergoing a morphological transformation may or may not be in direct contact with the optical data layer. In an exemplary embodiment, the material capable of undergoing a morphological transformation may be directly disposed on the optical data layer. In another embodiment, at least a portion of one or more layers (e.g., a capping layer) may be sandwiched between the material and the optical data layer such that the material capable of undergoing a morphological transformation is not in direct contact with the optical data layer. The material capable of undergoing a morphological transformation is designed to act as an anti-theft feature for the optical article to change the functionality of the optical article from the pre-activated state to the activated state. As used herein, the term "pre-activated state" of functionality refers to a state of functionality of the optical article where the material capable of undergoing a morphological transformation has not yet been exposed to one or more external stimulus. In the pre-activated state, at least a portion of the data on the optical data layer may not be readable. The "activated state" of functionality of the optical article refers to the state where the optical article has been exposed to one or more external stimulus. In the activated state of functionality, the data in the optical data layer is readable. In other words, the optical article may be read without any noise or disturbances/errors, which may otherwise have been present in the pre-activated state.

The material capable of undergoing a morphological transformation disposed on the optical article may inhibit theft or unauthorized use of the optical article by protecting at least a portion of the data to be read from the optical article in the pre-activated state. Upon activation, the material capable of undergoing a morphological transformation may be configured to alter one or more of its own optical properties, thereby allowing the optical article to be readable. The material capable of undergoing a morphological transformation is configured to irreversibly alter from the first morphology to the second morphology upon activation to alter the functionality of the optical article from the pre-activated state to the activated state.

In some embodiments, the optical article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a high definition optical recording media, such as a BLU-RAY DISC, a near field optical storage disc, a holographic storage medium, or another like volumetric optical storage medium, such as, for example, two-photon or multi-photon absorption storage format. As will be described in detail below, if the optical article is taken out of its packaging without being authorized, or if the optical article is attempted to be played without being authorized, the material capable of undergoing a morphological transformation will not allow at least a portion of the optical article to be readable.

In other embodiments, the optical article may also include an identification card, a passport, a payment card, a driver's license, a personal information card, or other security documents, all of which employ an optical data layer for data storage. As will be described in detail below, in these embodiments, the material capable of undergoing a morphological transformation renders the article unreadable by the reader until it is processed prior to being issued to the concerned authority. Hence, if the article is stolen before being issued, the data in the optical data layer is not readable and therefore the article is prevented from any un-authorized use before issuance.

In an exemplary embodiment, the optical article may be made of a polycarbonate. As used herein, the term "polycarbonate" refers to both aliphatic and aromatic polycarbonates, and any co-polymers of polycarbonates incorporating structural units derived from one or more dihydroxy compounds. For example, aromatic polycarbonates marketed under the trade names LEXAN® or MAKROLON® are suitable polycarbonates.

When an optical article goes from the pre-activated state to the activated state, a measured optical parameter changes from its first optical value to a second optical value where the change in optical value results in a change in the error state of a sector or multitude of sectors on the optical article. The variety of optical signals includes those that affect the readout from the optical article. For example, if an attempt is made to read the data stored in the optical data layer of the article, the material capable of undergoing a morphological transformation may inhibit the same because of optical state change. The material capable of undergoing a morphological transformation may render the optical article partially or completely unreadable in the pre-activated state of functionality of the optical article. In the pre-activated state, the material capable of undergoing a morphological transformation may act as a read-inhibit layer by inhibiting the laser from reaching at least a portion of the optical data layer and reading the data on the optical data layer. For example, the material capable of undergoing a morphological transformation may absorb a major portion of the incident laser, thereby impeding it from reaching the optical data layer to read the data. Alternatively, the material capable of undergoing a morphological transformation may reflect the incident laser before the laser reaches the optical data layer. In this way, the material capable of undergoing a morphological transformation prevents the laser from reading the data in the optical data layer. Upon interaction with the external stimulus, the material capable of undergoing a morphological transformation allows the incident laser to pass through, and reach the optical data layer to read the data.

The optical state change may include one or more of reflection efficiency, single layer reflectivity, dual layer reflectivity, refractive index, birefringence, polarization, scattering, absorbance, transparency, and optical path length. The nature of these signals originates from the several intrinsic light parameters that affect the signal measured by the detector assembly of the optical disc reader. These intrinsic light parameters include light intensity, directionality, polarization, and phase. The change in optical properties of the optical article upon exposure to an external stimulus, e.g., from the activation system, can appear in any manner that results in the optical data reader system receiving a substantial change in the amount of energy detected. In certain embodiments, the first morphology of the material capable of undergoing a morphological transformation is characterized by the first transparency, and the second morphology of the material capable of undergoing a morphological transformation is characterized by the second transparency, which is higher than the first transparency. In an exemplary embodiment, the second transparency is greater than about 30 percent. In this embodiment, the material capable of undergoing a morphological transformation may be disposed on a majority of the available area of the optical article. In another exemplary embodiment, the optical change in the material capable of undergoing a morphological transformation in the pre-activated state and the activated state of the optical article results in an optical reflectivity change of the optical article to at least about 10 percent. In this embodiment, the material capable of undergoing a morphological transformation may be disposed in a discrete area or may be patterned on the optical article.

The external stimulus may include a laser, infrared radiation, thermal energy, infrared rays, X-rays, gamma rays, microwaves, visible light, ultra violet light, ultrasound waves, radio frequency waves, microwaves, electrical energy, chemical energy, magnetic energy, mechanical energy, or combinations thereof. The interaction with the material capable of undergoing a morphological transformation may include continuous, discontinuous, or pulsed forms of the external stimulus. The external stimulus may be selected based on the type of material capable of undergoing a morphological transformation. For example, when the material capable of undergoing a morphological transformation includes a polymer blend, the external stimulus may be an electromagnetic radiation source of appropriate wavelength and power to make the polymer blend transparent to the laser, thereby changing the functionality of the optical article from an unreadable state to a readable state. In an exemplary embodiment, the material capable of undergoing a morphological transformation may include organic or inorganic additives. These additives may absorb the external stimulus, such as infrared radiation. In an exemplary embodiment, this absorption of the external stimulus by the additives may result in temperature change of the additives. This temperature change may cause local heating in the material capable of undergoing a morphological transformation, thereby making the material capable of undergoing a morphological transformation transparent to the incident laser.

As will be described in detail below with regard to FIG. 4, a tag having electrical circuitry may be employed to supply electrical or thermal energy to the material capable of undergoing a morphological transformation. In an exemplary embodiment, the tag may be a wirelessly powered flexible tag (WPFT) having electrical circuitry. The material capable of undergoing a morphological transformation may be used in combination with anti-theft features as disclosed in U.S. patent application Ser. No. 11/538,451, which is incorporated herein in its entirety by reference. Examples of electrical circuitry may include radio frequency circuitry, which may be used to interact with the external stimulus to change the external stimulus into electrical or thermal energy, which then interacts with the material capable of undergoing a morphological transformation to change the functionality of the optical article. The WPFT may be coupled to a surface employing the material capable of undergoing a morphological transformation by using a pressure-sensitive adhesive or by using other coupling mechanisms. Non-limiting examples of coupling mechanisms include static cling, gravity, bracing, sandwiching, mechanical clamping or any other physical means of adhesion. The electrical circuit may be configured to transform the external stimulus to electrical or thermal energy. The WPFT may either be permanently affixed to a surface or may be removably coupled to the surface having the material capable of undergoing a morphological transformation. The WPFT may be in direct contact with the material capable of undergoing a morphological transformation. The WPFT may be disposed on or adjacent to the material capable of undergoing a morphological transformation. Alternatively, the WPFT may be in operative association with the material capable of undergoing a morphological transformation, such that the WPFT is able to transfer the thermal or electrical energy produced by the WPFT to the material capable of undergoing a morphological transformation.

Various embodiments of the WPFT described herein allow the wireless transfer of energy from an external stimulus to the material capable of undergoing a morphological transformation through the WPFT, because the WPFT is configured to act as a "wireless" device. As used herein, the terms "wireless", "wirelessly", "wireless powered", "wirelessly powered" or "wireless activation" all refer to a mechanism of energy transfer in which electromagnetic energy is transported through space (e.g. without the use of any connecting wires or other physical connections) from a remote external stimulus to the WPFT. Non-limiting examples of suitable external stimuli that may be used to interact with the WPFT include laser radiation, infrared radiation, thermal energy, X-rays, gamma rays, microwaves, visible light, ultraviolet light, ultrasound waves, sound waves, radio frequency (RF) waves, electrical energy, chemical energy, magnetic energy, mechanical energy, or combinations thereof. Furthermore, inter-conversion between any of the above listed external stimuli (e.g. conversion of radio frequency waves to electrical energy and/or thermal energy) is also contemplated within the scope of this invention. The interaction of the external stimulus with the WPFT may include continuous, discontinuous, or pulsed forms of the external stimulus. In one embodiment, the external stimulus is radio frequency waves generated from an RF power supply, and wirelessly supplied to the WPFT. The RF power supply may contain a programmable interface that controls the WPFT and optionally receives information back from the WPFT.

Upon interaction with an external stimulus, the WPFT is configured to induce an electrical response, a thermal response, or a combination of both in the optical article. Various embodiments of the WPFT may find utility in applications where a wireless connection to either a heating element or an electrical circuit is preferred. It is envisioned that the WPFT could be used in a variety of technologies including, but not limited to, security and anti-theft applications, biotechnology applications, healthcare applications, sensor applications including biosensors, chemical sensors, photochromic sensors, electrochromic sensors, and thermochromic sensors, analytical instrumentation including portable instrumentation, DNA/RNA amplification, fermentation, or in situations requiring sterile or radioactive environments.

As used herein, the term "flexible" is synonymous with the term bendable, and the flexible aspect of a WPFT is analogous to the flexible aspect of other known flexible electronic devices such as flexible organic light emitting diodes, flexible liquid crystal displays, flexible circuit boards, and flexible solar cells. The flexible quality of the WPFT stems from the use of bendable materials within the WPFT, such as plastic or other polymeric materials, or thin metal foil.

In various embodiments, the WPFT includes a coupling layer. The coupling layer may either be a single layer or may be a combination of a plurality of sub-layers, which may be collectively termed as the coupling layer. The thickness of the coupling layer may be uniform or may vary from one point to another. For example, the coupling layer may have a variable thickness when the coupling layer is patterned to form one or more recess to dispose electrical circuits therein. In one embodiment the thickness of the coupling layer may be in a range from about 1 micron to about 100,000 microns. In a preferred embodiment, the thickness of the coupling layer is from about 1 micron to about 1000 microns.

The coupling layer may be coupled to the optical article by employing variety of coupling mechanisms to promote attraction forces between the WPFT and the optical article. The coupling mechanisms may include an adhesive mechanism, an electrostatic mechanism, a chemical mechanism, an electrochemical mechanism, a thermal mechanism, a physical mechanism, a cross linking mechanism, or any combination thereof. Non-limiting examples of suitable coupling mechanisms include static cling, gravity, bracing, sandwiching, mechanical fixing, clamping, chemical adhesion, or any other physical means of adhesion that affix the WPFT to the optical article. In some embodiments the coupling mechanism may enable reuse of the WPFT. In other words, the WPFT may be coupled and decoupled from the optical article more than once, as desired, and therefore it is envisioned that the WPFT could be a disposable device. Embodiments relating to the reuse of the WPFT with the same or different optical articles are described in more detail below with regard to the adhesive components of the coupling layer. Alternatively, the WPFT may be configured to function as an irremovable device once affixed to an optical article. The attraction forces produced by the above mentioned coupling mechanisms may or may not be uniform at the interface between the coupling layer and the optical article. For example, the attraction forces may be weaker at the edges of the WPFT to facilitate removal (e.g. peeling off) of the WPFT once the predetermined and desired electrical and/or thermal response has been induced in the optical article.

The coupling layer may include a plurality of individual sub-layers, which form a stack generally referred to as the coupling layer. In one embodiment, at least one sub-layer of the coupling layer comprises an adhesive component. Non-limiting examples of suitable adhesive components include pressure sensitive adhesives, epoxy based adhesives, thermoset adhesives, acrylate based adhesives, silicone-based adhesives, elastomer based adhesives or any combination thereof. As use herein, the term "pressure-sensitive adhesive" includes all polymeric adhesive materials with a glass transition temperature (Tg) below about 50° C. In embodiments comprising an adhesive component, the coupling layer includes a first coupling surface with a first tack strength, and a second coupling surface with a second tack strength. As used herein, the term "tack strength" refers to "stickiness" of the coupling layer, and is a measurement of the strength of adhesion, typically measured in units of pounds-force per inch. The first surface of the coupling layer is typically coupled to the optical article to define a first region. The second surface of the coupling layer may be coupled to other components of the WPFT, such as an electrical circuit layer or an optional backing layer, to define a second region. In at least one embodiment, both the first and second surfaces of the coupling layer are coupled to the optical article.

In embodiments where the coupling layer comprises an adhesive component, one aspect of the coupling layer is the ability of the WPFT to be decoupled from an optical article such that the WPFT undergoes a "clean adhesive failure" at the first region between the coupling layer and the optical article. As used herein, the term "clean adhesive failure" is defined as the removal of the WPFT from the optical article such that no significant residue of the coupling layer is left behind on the optical article. As used herein, and with respect to the term "clean adhesive failure", the term "significant" refers to a quantity that affects or interferes with the usability of the optical article. For example, as will be described in detail below, in the case where the optical article is a DVD, "clean adhesive failure" of the WPFT from the surface of the of the DVD means that the quantity of residue of the coupling layer which might be left behind on the surface of the DVD, including residue which is not visible to the naked eye or touch, is sufficiently small in quantity as to not interfere with the readability of the DVD in a standard DVD reader.

The WPFT further comprises electrical circuitry, including at least one electrode and/or at least one heating element. As used herein, the electrical circuitry includes, but is not limited to, a thermocouple, a light-emitting diode, a strain gauge, a sound detecting element, an antenna, a transistor, a diode, a rectifier, a logic chip, a radio frequency identification chip, a capacitor, an integrated circuit, an electrical receiver, a photocell, a rectifier, a resistor, a surface mount resistor, a chip resistor, an electrode, a surface mount light emitting diode (LED) or any combination or multiple thereof. In one embodiment, the WPFT may also contain an integrated circuit with a programmable unique identification number as is used in RFID tags. Various components of the electrical circuitry may be patterned onto the WPFT by a variety of microelectronic techniques including, but not limited to, lithography, sputtering, screen printing, ink-jet printing, or any other routine patterning method which is known to one skilled in the art of microelectronics. Alternatively, various components of the electrical circuitry may be added to the WPFT by physical means, such as "pick-and-place" or other robotic techniques commonly used in the microelectronics industry. In an exemplary embodiment, the electrical circuitry comprises a radio frequency circuitry, including a radio frequency antenna coupled to various additional circuitry components. The radio frequency circuitry is in electrical communication with at least one electrode and/or at least one heating element contained within the WPFT. The electrical circuitry may be disposed on a sub-layer of the coupling, or in embodiments where the WPFT employs an optional backing layer the electrical circuitry may be coupled to the backing layer.

In such embodiments where the WPFT comprises at least one heating element, the heating element may be fabricated from a material with sufficiently high surface ohmic resistivity. High surface ohmic resistivity can be achieved either by controlling the dimensionality of the heating element (e.g. making the heating element very thin), or as a result of the intrinsic electrical resistivity of the material. For example, materials with a surface ohmic resistivity greater than about 5 ohms/square are suitable, and materials with an ohmic resistivity greater than about 15 ohms/square are especially preferred. Non-limiting examples of suitable heating element materials include titanium, copper, nickel, gold, tantalum-nitride, aluminum, molybdenum, titanium-tungsten, chrome, platinum, nichrome, indium tin oxide (ITO) and any combinations thereof. Embodiments where the heating element is encased in a ceramic or glass housing (e.g. chip resistors) are also contemplated within the scope of this invention. It should be noted that in embodiments comprising a heating element, direct contact between the heating element and the material capable of undergoing a morphological transformation is not strictly required for the WPFT to induce the desired thermal response in the material capable of undergoing a morphological transformation; however, it is preferred.

The WPFT may be in operative association with one or more devices, such that the devices may receive energy from the external stimulus in one form and transfer it to the WPFT. The energy is then transferred from the WPFT to the optical article to which the WPFT is coupled to change the state of functionality of the optical article. For example, the WPFT may react with an external stimulus, such as radio frequency waves, and through operative association with the radio frequency circuitry within the WPFT, convert the radio frequency waves into electrical energy and/or thermal energy. The converted electrical energy may then be transferred to the optical article to change the functionality of the optical article from the pre-activated state to the activated state. In the case where the energy from the external stimulus is converted to an electrical response within the WPFT, current in the range from about 1 microampere to about 1 ampere and voltages in the range from about 1 millivolt to about 100 volts are possible at specific regions between the WPFT and the optical article. In the case where the energy from the external stimulus is converted to a thermal energy within the WPFT, a temperature increase in the range of about 10° C. to about 200° C. is possible at specific regions of the interface between the WPFT and the optical article.

Additionally, the WPFT may contain a feedback loop. The feedback loop may be configured to communicate with the source of the external stimulus that is at a remote location and provide inputs to regulate the exposure of WPFT to the external stimulus. For example, the feedback loop may be configured to maintain the temperature of the optical article within a predetermined temperature range by controlling the input of external stimulus to the WPFT. Accordingly, when the temperature of the optical article exceeds the predetermined temperature range, the feedback loop communicates with the source of the external stimulus to reduce the amount of external stimulus interacting with the WPFT, thereby controlling the temperature of the optical article. In another example, the feedback loop may be employed to maintain the records for the usage of the devices. When employed to authorize an article, the WPFT may be used to maintain records and/or to maintain inventory.

In some embodiments, the WPFT comprises an integrated logic chip within its electrical circuitry, which is in wireless communication with an external authorization device that controls the output response of the WPFT through a feedback loop. The function of the integrated logic chip is to act as an internal "on/off" switch within the WPFT, such that the WPFT becomes operationally active (i.e., generates an electrical and/or thermal response in the optical article to which it is affixed) only once it has been authorized to do so by an external authorization device. This feature of the WPFT is useful in applications where there is a desire to control the function of the WPFT, such as anti-theft applications.

In one embodiment, energy may be delivered to the WPFT by inductive coupling of low frequency radio waves with a wavelength much longer than the largest dimension of the WPFT. It should be appreciated that RF signals with long wavelengths are preferred for such applications, because they are easier to shield than signals with shorter wavelengths. In one embodiment, the transmission means may be identified as an air-core radio frequency transformer. For such transformers to efficiently transfer RF power, they must be matched to the impedance of the external source and load impedance. In one embodiment, the source of external stimulus is the external RF power generator and the load is the heating element(s) and/or electrode(s) to be operated on the WPFT. Impedances of 50 ohms are typical for the source, but impedances may range from a few ohms up to a few hundred ohms for the load(s). As will be appreciated, any impedance matching technique well known in the art can be used to match the transformer, but circuits that require only capacitors and the native inductance of the transformer coils are strongly preferred for their small size.

In one embodiment the energy transferred to the WPFT by inductive coupling is radio frequency alternating current whose frequency may range from hundreds of kHz to hundreds of MHz. This RF AC may be used directly for some embodiments of the WPFT, specifically those embodiments comprising at least one heating element. For such RF loads, the signal should be transmitted between the transformer secondary coil on the WPFT and the load by a RF transmission line to minimize radiation and to maintain the proper load impedance. If the load requires DC rather than AC, then a rectifier and possibly other electronic circuitry described above would be necessary to convert the energy into the required form.

In certain embodiments, the material capable of undergoing a morphological transformation may be disposed on at least a portion of the optical article in the form of a layer/film. The layer may either be a continuous layer, a discontinuous layer, or a patterned region. In an exemplary embodiment, a thin film comprising two polymers at an appropriate composition is laid down on the surface of the optical article by employing printing, direct write processing, lithography, sputtering, spin coating, or other suitable deposition techniques. The film is subjected to heating through a radio frequency circuitry with a resistive heating element, such as a microheater or a pair of microelectrodes that is wirelessly powered by exposing the packaged DVD to an external radio frequency field. Due to the radio frequency heating effects, the material capable of undergoing a morphological transformation goes through the phase transition(s) or phase transitions. In one embodiment, the optical article is playable when the film is in a homogenous one-phase state, and unplayable when it is in a state separated morphology that can scatter the laser beam. In another embodiment, the optical article may be made playable if the polymer blend undergoes a transition from a single-phase (transparent) morphology to a state separated (light scattering) morphology, when a tailored menu is employed as described below.

Additionally, in case of fewer than all of the discrete portions of the optical article having the material capable of undergoing a morphological transformation, the discrete portions not having the material capable of undergoing a morphological transformation may be made such that if interacted with the external stimulus the material will render the optical article at least partially unreadable. In these embodiments, only the seller will be aware of the location of the discrete portions having the material capable of undergoing a morphological transformation, which needs to be interacted with the external stimulus to render the optical article playable.

The optical article may include a tailored menu in combination with one or more material capable of undergoing a morphological transformation. As used herein, the term "tailored menu" refers to errors that are created in control block sectors of the optical article to render at least a part of the optical article unreadable. The tailored menu may be authored such that the optical article may boot to a menu, which allows complete reading of the entire data set on the optical article if the control block is readable. A tailored menu may be located in the optical data layer of the optical article. In one embodiment, the first valid or readable file that the player may encounter when scanning from the inner hub outward is the tailored menu. This tailored menu may be such that, the tailored menu may disallow the incident laser to scan further, or may not allow the user to go anywhere except back to the start up menu.

The tailored menu may be in operative association with the material capable of undergoing a morphological transformation, such that when the optical article is exposed to an external stimulus, the material capable of undergoing a morphological transformation may react with the external stimulus and make the tailored menu unreadable for the incident laser. That is, as a result of interaction of the material capable of undergoing a morphological transformation with an external stimulus, the material capable of undergoing a morphological transformation may render that particular portion of the optical data layer having the tailored menu unreadable by the read laser. For example, when the tailored menu is employed in combination with a radiation sensitive material capable of undergoing a morphological transformation, as a result of interaction with the radiation, the radiation sensitive material capable of undergoing a morphological transformation may become opaque to the incident laser, thereby preventing the tailored menu from being read by the incident laser. The radiation sensitive material capable of undergoing a morphological transformation may include for example, a radio frequency sensitive or microwave sensitive material capable of undergoing a morphological transformation. It should be noted that, in these embodiments where the material capable of undergoing a morphological transformation is applied with the tailored menu, the morphological transformation is in a reverse direction relative to the morphological transformation when the material capable of undergoing a morphological transformation is applied on the optical data layer without a tailored menu. For example, when applied in combination with a tailored menu, the material capable of undergoing a morphological transformation may change from a disordered state to an ordered state.

Referring now to FIG. 1, the optical article 10 includes a data storage region 12 and an inner hub 14. The data storage region 12 includes an optical data layer 20 (FIG. 2), which stores the data, whereas the inner hub 14 is the non-data storage region of the optical article 10. The optical article 10 has a material capable of undergoing a morphological transformation disposed on the data storage region 12 in the form of a film 16 in the pre-activated state of the optical article 10.

The material capable of undergoing a morphological transformation may interact with an external stimulus, such as radiation of a predetermined wavelength range. The optical article 10 upon interaction with the external stimulus undergoes an optical state change, whereby a property or characteristic of the material capable of undergoing a morphological transformation is altered to change the state of functionality of the optical article 10. For example, in the pre-activated state of the optical article 10, the material capable of undergoing a morphological transformation of the film 16 may be opaque to the incident laser that is used to read the optical article 10. That is, in the pre-activated state the material capable of undergoing a morphological transformation may inhibit the incident laser from reaching the optical data layer 20, whereas after interacting with the external stimulus the material capable of undergoing a morphological transformation may become transparent to the wavelength of the incident laser.

The film 16 may cover at least a portion of the optical article 10. In the pre-activated state., the optical article 10 may be unplayable or unreadable at least in the portions where the film 16 is disposed. In other words, the optical article 10 has a reflectivity of less than about 45 percent, or preferably less than about 20 percent, or more preferably less than 10 percent in the portions where the film 16 is disposed.

Figure 2:
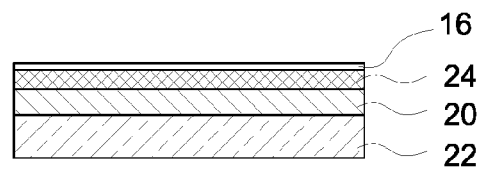
FIG. 2 is a cross-sectional side view of the optical article of FIG. 1 taken along line II-II.

FIG. 2 illustrates a cross-sectional side view of the optical article 10 of FIG. 1. In a simplified illustration of the optical article 10, the optical article 10 includes an optical data layer 20 disposed on a substrate 22. The substrate 22 may include a polycarbonate material. The optical data layer 20 is protected by employing a capping layer 24. It should be appreciated that the capping layer 24 is transparent to the wavelength of the incident laser, which is used to read the data stored in the optical article 10. The capping layer 24 may be of polycarbonate, and this may also include a material capable of undergoing a morphological transformation. The capping layer 24 may prevent the optical data layer 20 from exposure to environmental elements, such as air, oxygen, moisture, which may react with the optical data layer and cause any undesired changes, such as oxidation of the optical data layer. Also, the capping layer 24 may prevent mechanical damages to the surface of the optical data layer 20. For example, the capping layer 24 may be scratch resistant. Further, the optical article 10 includes a film 16 of the material capable of undergoing a morphological transformation, which is disposed on the capping layer 24.

Figure 3:
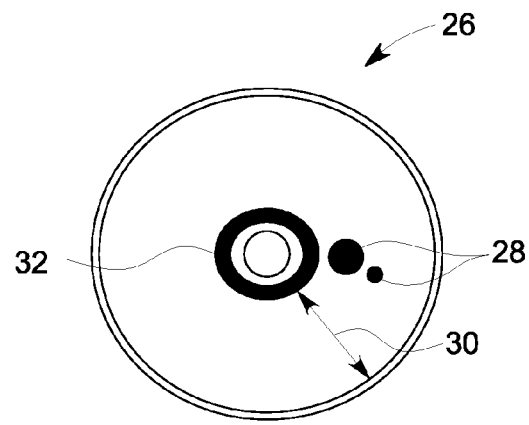
FIG. 3 is a schematic view of an optical article having a material capable of undergoing a morphological transformation disposed in a discrete area in accordance with an exemplary embodiment of the invention.

FIG. 3 illustrates an optical article 26 having a material capable of undergoing a morphological transformation disposed thereon in discrete portions 28 in the pre-activated state of the optical article 26. The portions 28 are disposed in the data storage region 30 surrounding the inner hub 32. The optical article 26 may have an optical reflectivity of less than 45 percent in these portions 28. Therefore, the optical article 26 may not be readable in these portions 28. In some embodiments, fewer than all of the discrete portions 28 may include material capable of undergoing a morphological transformation. In these embodiments, the portions having the material capable of undergoing a morphological transformation are made to interact with the external stimulus to change the state of functionality of the optical article 26.

Figure 4:
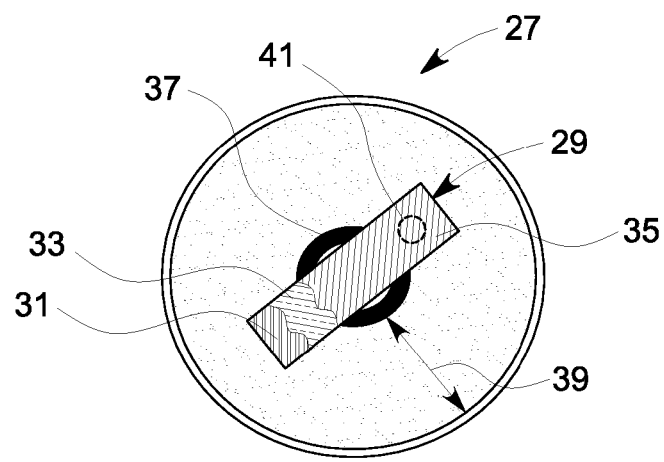
FIG. 4 is a schematic view of an optical article having a tag with radio frequency circuitry disposed on the material capable of undergoing a morphological transformation in accordance with an exemplary embodiment of the invention.

FIG. 4 illustrates an optical article 27 having a tag 29 disposed on the material capable of undergoing a morphological transformation. The optical article 27 is in a pre-activated state. The structure 29 is in the form of a flexible label and includes a coupling layer 31 and a circuitry layer 33.

The coupling layer 31 may include a pressure-sensitive adhesive, or a static layer. The circuitry layer 33 may include a radio frequency circuitry. The radio frequency circuitry on the structure 29 may react with radio frequency radiation to produce thermal energy to convert the material capable of undergoing a morphological transformation underneath the structure 29 from a first morphology to a second morphology. Optionally, the tag 29 may also include a pair of microelectrodes, a micro-heater, a resistor, or a capacitor in combination with the radio frequency circuitry. The tag 29 may also include a backing layer 35. The backing layer 35 may be employed to provide mechanical strength to the structure 33. As illustrated, the circuitry layer 33 is disposed between the coupling layer 31 and the backing layer 35. Alternatively, the backing layer 35 may be attached directly to the coupling layer 31, and the circuitry layer 33 may be coupled to the backing layer 35.

In the illustrated embodiment, the structure 29 is disposed across the inner hub 37 and onto the data storage region 39. In other embodiments, the structure 29 may be disposed in different locations of the optical article 27. For example, the structure 29 may be disposed within the data storage region 39. Further, a material capable of undergoing a morphological transformation 41 is in operative association with the structure 29. That is, the material 41 is configured to receive either thermal or electrical energy from the structure 29, when the structure 29 is exposed to external stimulus. The thermal or electrical energy may then interact with the material 41 to change the optical properties of the material 41. The change in optical properties of the material 41 changes the state of functionality of the optical article 27 from the pre-activated state to the activated state.

Figure 5:
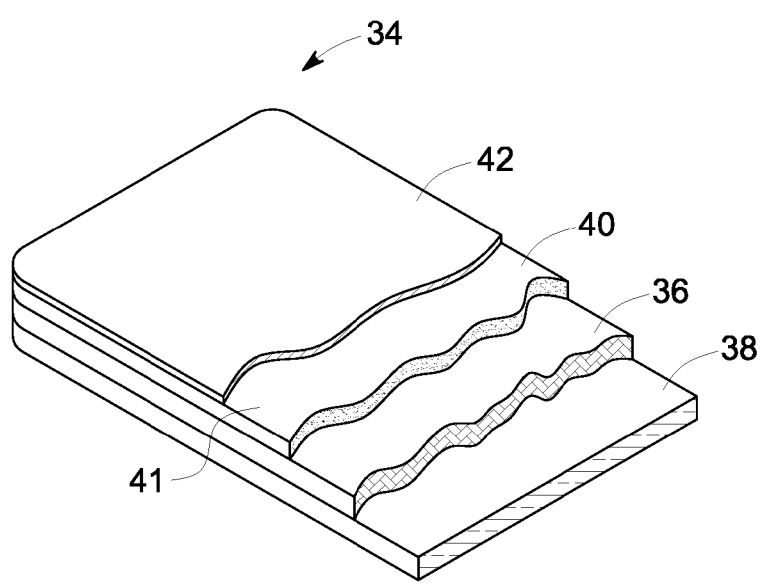
FIG. 5 is a partial perspective view of an identification card having a material capable of undergoing a morphological transformation disposed on an optical layer in accordance with an exemplary embodiment of the invention.

Turning now to FIG. 5, a simplified structure of an optical article, such as an identification (ID) card 34 is illustrated. As with the optical article 10 and 26, the ID card 34 includes an optical data layer 36 for storing data. The ID card 34 further includes a substrate 38 on which the optical data layer 36 is disposed. The substrate 38 may include a polycarbonate material. In an exemplary embodiment, the substrate 38 may include the material capable of undergoing a morphological transformation that may change an optical property upon interaction with the external stimulus, thereby changing the state of functionality of the card 34. A capping layer 40 protects the optical data layer 36. As with the substrate 38, the capping layer 40 may include a polycarbonate material and may also include a material capable of undergoing a morphological transformation. As noted above with regard to the capping layer 24, the capping layer 40 may be used to protect the optical data layer 36 from chemical and/or mechanical damages.

The ID card 34 includes a material capable of undergoing a morphological transformation disposed on the surface 41 of the capping layer 40 in the form of a film 42. In the pre-activated state, the film 42 may prohibit the incident laser from reaching to the optical data layer 36 and reading the data stored therein. However, after interaction with the external stimulus, the film 42 may allow an incident laser to pass through and reach the optical data layer 36, thereby allowing the reader to read the data stored in the optical data layer 36 of the card 34. The ID card 34 may be exposed to the external stimulus before issuing the ID card 34 to the concerned authority, thereby rendering the data in the optical data layer 36 readable by the incident laser. By protecting the data in this manner before issuance of the ID card 34 to the concerned authority, the undesirable use of the card may be prevented in the event the card is stolen from the store where the card was stored prior to issuance. The film 42 may be disposed in different forms on the surface of the capping layer 40. For example, the film 42 may extend across a portion of the capping layer 40, or may form a patterned layer extending across a portion of the capping layer 40, or may form a continuous film, such as film 42, on the capping layer 40.

As described with regard to FIGS. 1-5, the material capable of undergoing a morphological transformation renders the optical article completely or partially unreadable in the pre-activated state of functionality by changing the reflectivity of the optical article at certain locations. In the activated state of functionality of the optical article, the properties of the material capable of undergoing a morphological transformation are changed from those in the pre-activated state by interacting the optical article with the external stimulus, as will be described below. Therefore, the optical article is ineffective in the pre-activated state.

In some embodiments, the material capable of undergoing a morphological transformation includes a polymer blend of two or more polymers, or a polymer solution of one or more polymers in one or more solvents. The polymer blend has a first miscibility that is representative of the first morphology and a second miscibility that is representative of the second morphology. In certain embodiments, the first and second morphologies are identified by thermal or photo-induced polymerization or cross-linking of the blends. In some embodiments, the blend of materials includes a polymer and polymerizable materials, a blend of polymer and crosslinkable materials, a blend of a polymer blend and polymerizable materials, or a blend of polymer and crosslinkable materials. The polymerizable or crosslinkable materials may include monofunctional, difunctional and multifunctionals materials such as oligoether and monomer acrylates, oligoether and monomer methacrylates, epoxy acrylate, aliphatic and aromatic urethane acrylates, polyester acrylates, or combinations of two or more thereof.

The polymer blend is configured to undergo a change in miscibility upon activation by an external stimulus. That is, the blend exhibits a first miscibility in the pre-activated state of the optical articles, and exhibits a second miscibility in the activated state of the optical article. In an exemplary embodiment, the miscibility may be changed by varying the temperature of the polymer blend. In other words, the polymer blend may be changed from a single phase to a phase-separated state by varying the temperature. The change in miscibility may categorize the polymer blend in two different types, namely the Upper Critical Solution Temperature (UCST) and the Lower Critical Solution Temperature (LCST). The UCST blends exhibit a phase separated morphology at lower temperatures and homogenize into a single phase when heated above the critical temperature. On the other hand, the LCST blends exhibit a single-phase morphology at lower temperatures and a phase-separated morphology at high temperatures. Sometimes, blends exhibit both UCST and LCST and are termed as "Close Loop Miscibility" polymer blends. The non-limiting example of Close Loop Miscibility blends may include polymethyl methacrylate, polyethylene oxide, and poly(hydroxyl ether of bisphenol-A).

It should be noted that the phase transition temperature may be tuned as a function of relative volume fractions of the two components in the blend. Moreover, the progress of the phase separation process from a one-phase state to a two-phase state can occur through two different processes, namely spinodal decomposition, or nucleation and growth. Both these processes can lead to micron-sized phase separated domains. The spinodal decomposition is associated with strong concentration fluctuations and gradual growth of a co-continuous phase separated morphology of the two polymers, with a characteristic length scale of the order of microns. The length scale of the morphology of the polymer blend depends on the quench depth and time for growth, and can be varied in a systematic manner depending on for example, temperature and the rate of heating or cooling. For the length scale of the order of microns, the blend may scatter most of the light from the incident laser and make the optical article unplayable.

Figure 6:
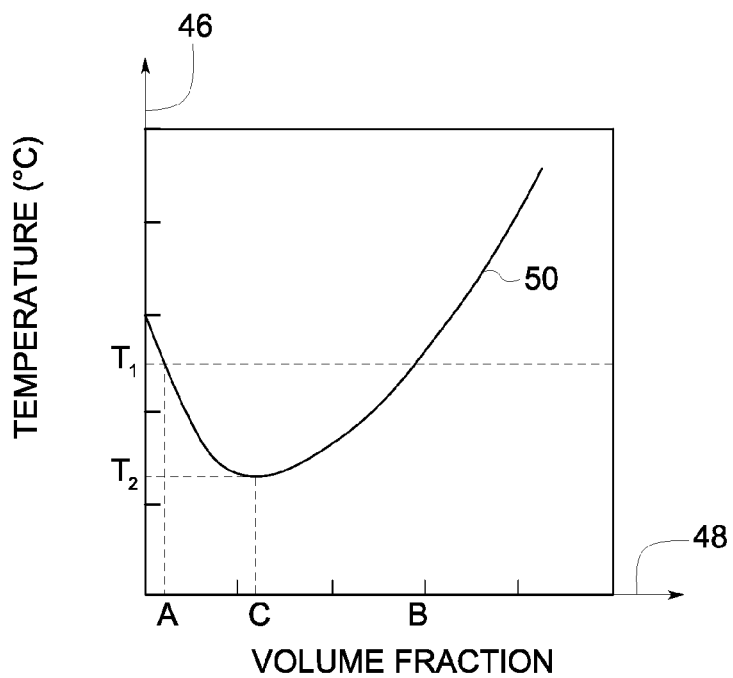
FIG. 6 is a graphical representation of the phase diagram of the LCST polymer blend in accordance with an exemplary embodiment of the invention.

FIG. 6 illustrates an exemplary phase diagram of a LCST blend. In the illustrated embodiment, the x-axis represented by reference numeral 48 illustrates the volume fraction of one of the components of the blend, whereas the y-axis represented by the reference numeral 46 illustrates the temperature of the polymer blend. As illustrated by the curve 50, at higher temperature $T_1$, a polymer blend with an overall composition C phase separates into two phases with compositions A and B. Due to phase separation, the material is turbid and scatters the incident laser. However at temperatures less than $T_2$ (critical temperature), the polymer blend exists as a single-phase blend. The single-phase blend with composition C is transparent to the incident laser, thereby making the optical article readable at temperatures less than $T_2$. In an exemplary embodiment, the polymer blend may include a combination of polystyrene and poly(vinyl methyl ether), or polymethyl methacrylate and poly(styrene-co-maleic anhydride). In one embodiment, a critical temperature of the polymer blend of polystyrene and poly(vinyl methyl ether) occurs at about 90° C. In addition, the glass transition temperatures of polystyrene and poly(vinyl methyl ether) are 100° C. and −22° C. respectively. As described below, by subjecting the film through appropriate heat-cool cycles, the optical article can be made playable or unplayable.

In one embodiment, a film of a LCST polymer blend may be deposited on the optical article. Subsequently, the film is heated above critical temperature ($T_2$) into phase separation. The polymer blend may then be rapidly quenched below the glass transition temperature (Tg), to preserve the phase separated cloudy morphology, thereby rendering the optical article unplayable. At the point of sale, the film may be heated to a higher temperature (below the critical temperature) to convert the polymer blend in the one-phase region, thereby making the film optically transparent to make the optical article playable.

Figure 7:
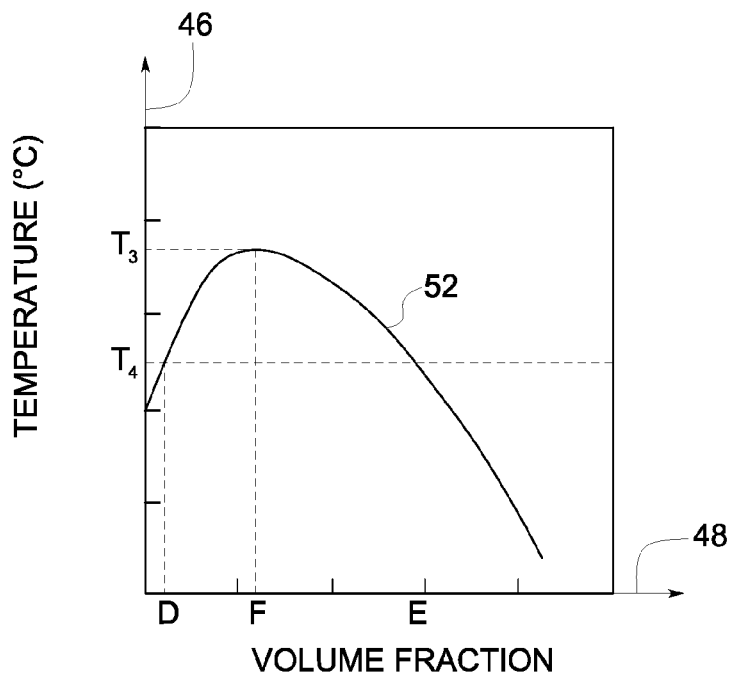
FIG. 7 is a graphical representation of the phase diagram of the UCST polymer blend in accordance with an exemplary embodiment of the invention.

FIG. 7 illustrates a phase diagram of the UCST blend, where the blend with a composition F splits into two separate phases D and E at a lower temperature $T_4$, and exists as a single phase at temperatures higher than $T_3$, as illustrated by the curve 52. For example, the polymer blend may include polystyrene with one or more of a styrene-butadiene-styrene, poly(methyl phenyl siloxane), polyisoprene or poly(4-methyl styrene), polymethyl methacrylate with poly(n-butyl methacrylate), or poly(isobutyl methacrylate).

In this embodiment, a film of a UCST polymer blend may be deposited on the optical article. The film may be heated above the critical temperature of the blend resulting in a single-phase blend. The blend may then be cooled below the critical temperature and held at that temperature to anneal above the glass transition temperature to induce phase separation. At the point of sale, the optical article having the film may be heated above the critical temperature to make the polymer blend homogeneous. However, the polymer blend is quenched below the glass transition temperature rapidly to avoid providing time for the phases to separate, so that the one-phase state is trapped.

In alternative embodiments, the optical article having a tailored menu is used in combination with a LCST or a UCST polymer blend. In these embodiments, the LCST or UCST polymer blends of the type described above could be used in a reverse scheme. That is, in these embodiments, the polymer blend in the pre-activated state of the optical article is in a single-phase state and is transparent to the incident laser and the polymer blend in the activated material of the optical article may be in a phase-separated state in which the polymer blend scatters the incident laser. In an exemplary embodiment, a polymer blend exhibiting LCST behavior is disposed on the optical article. The polymer blend disposed over the data sectors associated with the tailored menu is clear at room temperature. Therefore, the incident laser is able to read the tailored menu in the pre-activated state to render the disc unplayable. During activation, the polymer blend is heated above the critical temperature to induce phase separation. The separated phase then prevents the incident laser from reaching the tailored menu, thereby making the disc playable. The optical article may be rapidly cooled to freeze the separated phases over the regions having the tailored menu.

In the embodiments of FIGS. 6 and 7, the polymer blend inhibits the reading laser from reaching the optical data layer of the optical article in the low miscibility state, that is, in the state when the polymer blend exists in separate phases. Upon activation, for example, by heating (UCST) or cooling (LCST), the polymer blend changes from multi phase to single phase and becomes transparent to the incident laser. The polymer blend may be heated or cooled by applying various external stimuli as will be described in detail below.

In certain embodiments, the material capable of undergoing a morphological transformation includes a polymer in the pre-activated state, activated state, or both. Non-limiting examples of the polymers for the material capable of undergoing a morphological transformation include poly(alkenes), poly(anilnes), poly(thtiophenes), poly(pyrroles), poly(acetylenes), poly(dienes), poly(acrylics), poly(methacrylics), poly (vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly(esters), poly(anhydrides), poly (urethanes), poly(sulfonates), poly(siloxanes), poly(sulfides), poly(thioesters), poly(sulfones), poly(sulfonamides), poly(amides), poly(ureas), poly(phosphazenes), poly(silanes), poly(silazanes), poly(benzoxazoles), poly(oxadiazoles), poly(benzothiazinophenothiazines), poly(benzothiazoles), poly(pyrazinoquinoxalines), poly(pyromellitimides), poly(quinoxalines), poly(benzimidazoles), poly(oxindoles), poly(oxoisoindolines), poly(dioxoisoindolines), poly(triazines), poly(pyridazines), poly(piperazines), poly(pyridines), poly(piperidines), poly(triazoles), poly(pyrazoles), poly(pyrrolidines), poly(carboranes), poly(oxabicyclononanes), poly (dibenzofurans), poly(phthalides), poly(acetals), poly(anhydrides), carbohydrates, liquid crystalline polymers, and copolymers of the above monomers.

In some embodiments, the morphological transformation may include order-disorder phase transition to alter the functionality of the optical article. In these embodiments, the order-disorder transition may occur in a block copolymer. An aligned block copolymer film in an ordered state exhibits high birefringence, thereby making the optical article unreadable. In this embodiment, a block copolymer film is deposited on the optical article in an aligned/ordered state. Non-limiting examples of block copolymers include polystyrene-polyisoprene, polystyrene-poly(methyl methacrylate), polystyrene-poly(dimethyl siloxane), polystyrene-poly(vinyl pyridine), styrene-butadiene-styrene, polystyrene-n-pentyl methacrylate, SBS (Styrene-butadiene-styrene) and SIS (styrene-isoprene-styrene) block copolymers.

The alignment or ordered state may be achieved by techniques such as squeeze flow, by pressing down a small amount of the block copolymer, above its glass transition temperature, but below the order disorder transition temperature. Alternatively, the alignment and deposition steps may be separated. A self-assembled and aligned block copolymer film may be fabricated separately and then laid down on the optical article by an appropriate deposition procedure. The film could be adhered to the optical article by an adhesive or a solvent or by simple electrostatic adhesion. Due to the birefringent nature of the block copolymer, the film rotates the plane of polarization of the incident beam, and as a result induces errors in the readout, making the optical article unplayable. At the point of sale, the block copolymer is heated above the order-disorder transition temperature to alter the microstructure, and thereby changing the birefringence. Upon cooling the film rapidly to room temperature, below the glass transition temperature of one of the blocks, the polymer is trapped in the disordered state, or the optically clear transparent state with birefringence lower than the upper specification limit. As a result the optical article is playable. In this embodiment, RF circuitry may be utilized in producing the desired heat flux for order-disorder transition.

In another embodiment, the material capable of undergoing a morphological transformation may be configured to switch between a first morphology, which is crystalline, and a second morphology, which is amorphous. In this embodiment, the optical article may be read by the incident laser only in the amorphous state of the material capable of undergoing a morphological transformation. Non-limiting examples of suitable materials for crystalline to amorphous or amorphous to crystalline transitions may include one or more of a polycarbonate, a polyacrylate, a polystyrene, a polyester, a polyethylene, a polypropylene, or liquid crystalline polymers.

In another embodiment, selective regions of the optical article are crystallized by treating with a suitable solvent. In an exemplary embodiment, crystallinity is induced in the polycarbonate portion of an optical article by employing one or more of acetone, butyl acetate, or toluene as a solvent. The crystallized regions are usually not transparent, and the crystallites may scatter a significant portion of the incident laser. As a result, the crystallized regions make the optical article unplayable. At the point of sale, the crystallites may be melted by spot heating. Spot heating may be facilitated by employing RF circuitry. After melting and subsequent cooling the spot becomes transparent to the incident laser, thus enabling the playability of the optical article. In these embodiments, in the absence of the solvents at the point of sale, the polycarbonate of the optical article does not re-crystallize upon cooling.

Figure 8:
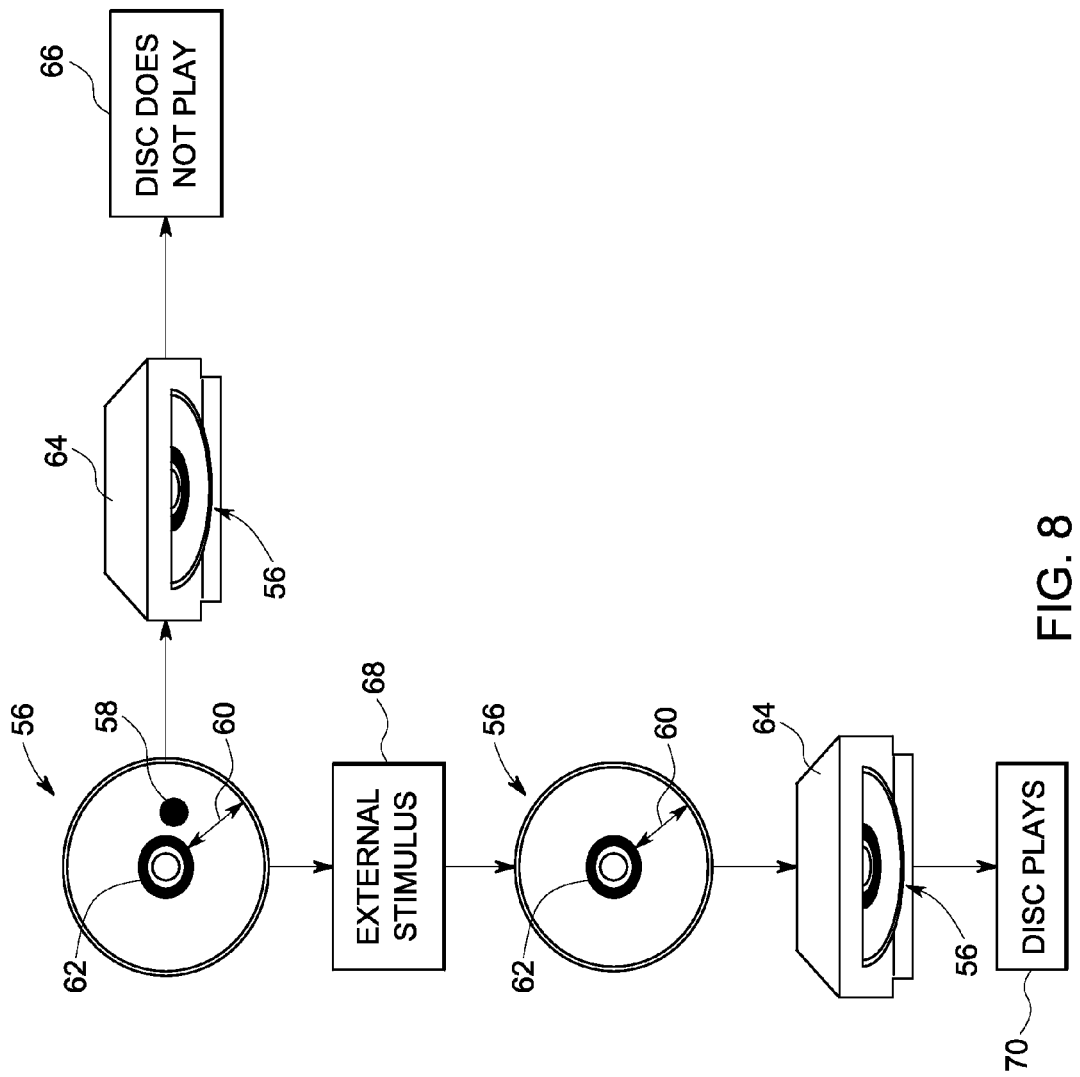
FIG. 8 is a diagrammatical representation of a method for changing a functionality of an optical article in accordance with an exemplary embodiment of the invention.

FIG. 8 illustrates a method of changing a functionality of an optical article 56. The method may be applied for other optical articles, such as an ID card, a payment card, a personal information card, and the like. As illustrated, the optical article 56 includes a data storage region 60 having a material capable of undergoing a morphological transformation disposed in discrete portions 58. Although not illustrated, the material capable of undergoing a morphological transformation may be disposed in the form of a continuous layer, or a patterned layer. The optical article 56 also has an inner hub 62. When inserted in an optical reader 64 prior to directing an external stimulus on it (pre-activated state), the optical article 56 does not play, that is, the data in the optical data layer (not shown) of the optical article 56 is unreadable (block 66). However, when interacted -with an external stimulus 68, the material capable of undergoing a morphological transformation alters the functionality of the optical article 56 (activated state) as described above and renders it readable by the reader 64 (block 70).

Figure 9:
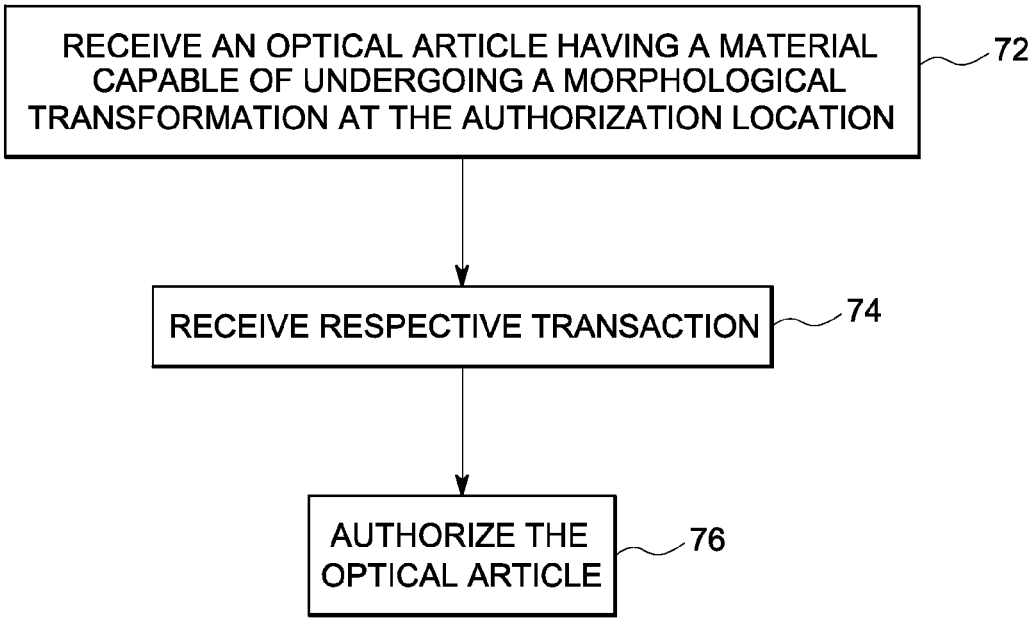
FIG. 9 is a diagrammatical representation of a method of transaction of an optical article employing a material capable of undergoing a morphological transformation as an anti-theft feature in accordance with an exemplary embodiment of the invention.

FIG. 9 illustrates a method of transaction of an optical article having a material capable of undergoing a morphological transformation. At step 72, an optical article having the material capable of undergoing a morphological transformation is received for transaction. The transaction may be carried out at a location, such as a point-of-sale of a shop from where the optical article is being purchased, or a storage location in a working place, where the authorization of the optical article is necessitated prior to being issued to the user. The activation time at the point-of-sale may be less than about 20 seconds to facilitate fast transaction time. For example, the activation time may be in a range from about 3 seconds to about 10 seconds. It should be noted that for simplicity, throughout the application the term "point-of-sale" is used to represent any location where the authorization of the optical article takes place to make it available to the user, such as a customer. At step 74, the transaction for the optical article is received. The transaction may either include a monetary transaction or verification of the user receiving the optical article. For example, at a point-of-sale of a shop, the transaction may include a monetary transaction, whereas in an office premises the transaction may include verification of the user receiving the optical article.

At step 76, the optical article is authorized for use, that is, the state of functionality of the optical article is changed from a pre-activated state to the activated state at a location, such as a point-of-sale. Accordingly, if the optical article is taken without a proper transaction being conducted, the optical article will not be readable. The authorization of the optical article may be done in several ways at the authorization location. For example, the optical article may be authorized by exposing the optical article to a light source having a predetermined power and emitting a light of predetermined wavelength range by placing the optical article with or without the packaging in a container having the light source. In this embodiment, the packaging may have a window as described below with regard to FIG. 10 and the light may be directed to at least a portion of the material capable of undergoing a morphological transformation through the window.

Figure 10:
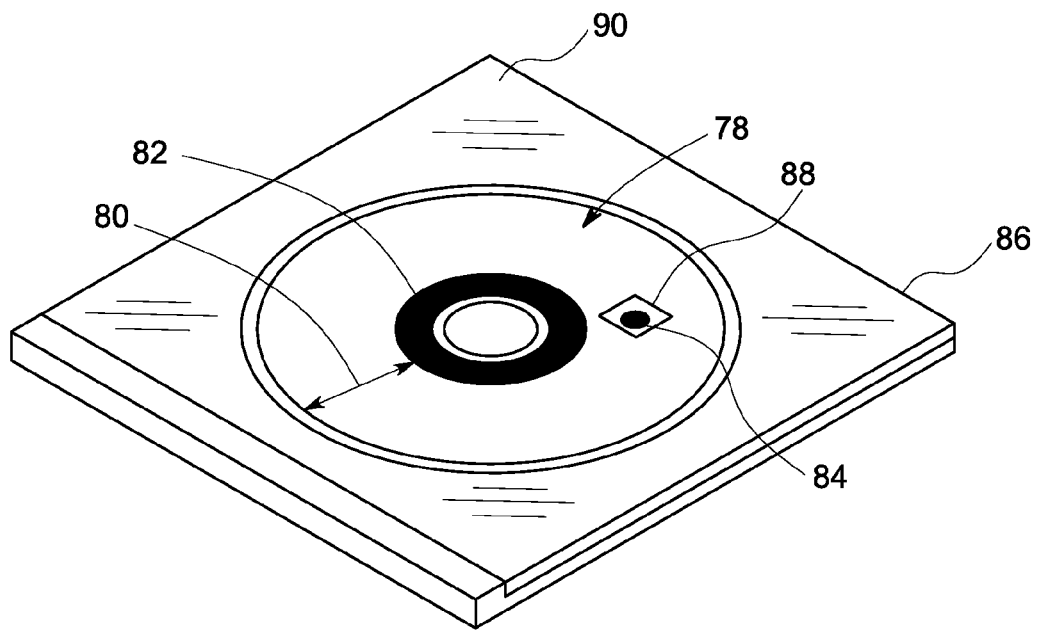
FIG. 10 is a perspective view of an optical storage medium disposed inside a packaging in accordance with an exemplary embodiment of the invention.

FIG. 10 illustrates an optical article, such as an optical storage medium 78, having a data storage region 80 and an inner hub 82. The optical storage medium 78 includes a material capable of undergoing a morphological transformation disposed in discrete portions 84 on the optical storage medium 78. The optical storage medium 78 is stored inside a packaging 86. The packaging 86 may direct an external stimulus towards the portion 84 through a window 88 that is aligned with at least a portion of the material capable of undergoing a morphological transformation. In the illustrated embodiment, the rest of the area 90 of the packaging 88, other than the window 88, may not be transparent to the external stimulus, and therefore may not participate in directing the external stimulus 68 from outside the packaging 86 towards the portions 84.

EXAMPLE 1

Figure 11:
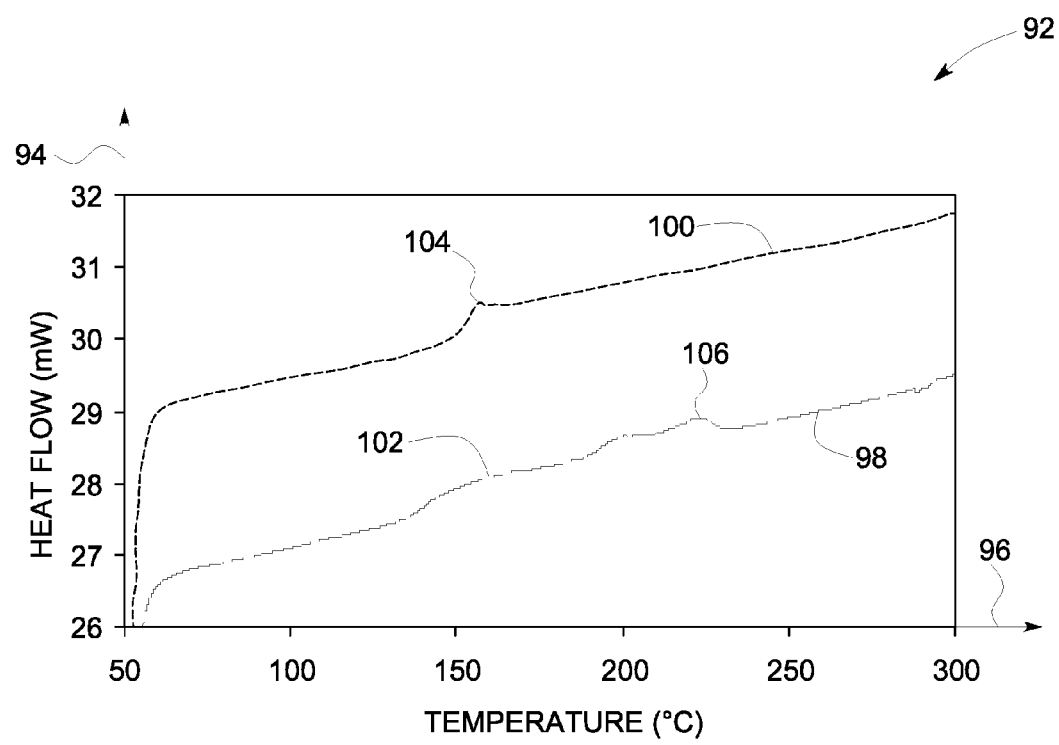
FIG. 11 is a graphical representation of Differential Scanning Calorimetry traces of a sample in accordance with an exemplary embodiment of the invention.

In one embodiment, Differential Scanning Calorimetry (DSC) (obtained from Perkin Elmer, Boston, Mass.) was used as a tool to characterize the glass transition and the melting transition in the polycarbonate material of the optical article. A piece of LEXAN®, representative of the polycarbonate material of the optical article, capable of undergoing morphological transformation, was treated with acetone on the surface and crystallized. FIG. 11 is a graphical illustration of the sample after first heating and the second heating. The graph 92 represents heat flow on y-axis 94 with respect to the temperature illustrated on the x-axis 96. The DSC trace 98 corresponds to the first heating and the DSC trace 100 corresponds to the second heating. As illustrated, the DSC trace 98 of the sample shows a glass transition 102 occurring around 150° C., then a melting peak 106 around 220° C. The sample was subsequently cooled and re-heated. In the absence of solvent, the polycarbonate will not re-crystallize, hence the DSC traces in the second heating trace shows only the glass transition 104 and no melting peak, because of absence of crystallites. The crystalline polycarbonate is cloudy as well as birefringent whereas the amorphous polycarbonate is transparent and non-birefringent. Hence in this embodiment, both the birefringence change and the change in transparency can be used as the activation tool.

EXAMPLE 2

A solution having (i) polystyrene having a molecular weight in a range from 500 g/mol to 8000 g/mol obtained from Aldrich (St. Louis, Mo.), (ii) SR-238 which is a commercial product of 1,6-hexanediol diacrylate obtained from Sartomer Company, Inc. (Exton, Pa.), (iii) benzoyl peroxide obtained from Aldrich, and (iv) toluene obtained from Aldrich, was prepared. Benzoyl peroxide was employed as an initiator for polymerization. A solution was made by mixing the components in following ratios: 67 parts of polystyrene, 33 parts of SR-238, 5 parts of benzoyl peroxide, and 400 parts of toluene. A wet film of the solution was made by drawdown on a glass slide. A clean room tape of 60 micron thick with a punched hole was used to set the wet film thickness. A small drop of the solution was transferred to the hole and a glass slide was served as a drawdown bar. The drawdown film was allowed to dry for about 12 hours at a temperature of about 25° C., to form a homogeneous film. The film was then treated at an elevated temperature at which the benzoyl peroxide decomposed to generate free radicals to polymerize SR-238. Phase separation due to incompatibility of polystyrene and acrylic polymer was evidenced from the appearance of the film changing from transparent to milky. The reflectivity at 650 nm wavelength of the dried film before and after a heat treatment at 150° C. for 2 minutes were measured to be 99.9% and 51.2%, respectively, with an optical instrument by Analytical Instrument Systems, Inc.

EXAMPLE 3

Polystyrene having a molecular weight of about 289000 was obtained from PolyScience (7800 Merrimac Ave. Niles, Ill.). Polyvinyl methyl ether (PVME) aqueous solution of 50% solids was obtained from Aldrich (St. Louis, Mo.), and dried in a vacuum oven. SR-238, which is a commercial product of 1,6-hexanediol diacrylate was obtained from Sartomer Company, Inc. (Exton, Pa.). Benzoyl peroxide (BPO) was purchased from Aldrich and used as an initiator for polymerization. A solution was made by mixing the following components: 30 parts of PS, 70 parts of PVME, 15 parts of SR-238, 2 parts of BPO and 150 parts of toluene. A 60 microns thick wet film of the solution was made by drawdown on a glass slide. The drawdown film was allowed to dry overnight at an ambient temperature, to form a homogeneous and transparent solid film. The film was then treated at an elevated temperature to achieve the phase separation of polystyrene and polyvinyl methyl ether. Further, the decomposition of benzoyl peroxide induced the polymerization of SR-238. The polymerization of SR-238 is expected to not only increase the incompatibility of the system but also to prevent a reversible phase transition after the temperature was dropped to below the Lower Critical Solution Temperature (LCST). The reflectivities of the dried film at 650 nm wavelength before and after a heat treatment at 150° C. for 2 minutes were measured to be 93.2% and 22.2%, respectively, with an optical instrument by Analytical Instrument Systems, Inc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

What is claimed as new and desired to be protected by Letters Patent of the United States is:

1. An optical article configured to transform from a pre-activated state of functionality to an activated state of functionality, comprising:
    an optical data layer for storing data, wherein said data is capable of being read from said optical data layer in the activated state of functionality; and
    a material capable of undergoing a morphological transformation being disposed on said optical data layer and adapted to being irreversibly altered from a first morphology to a second morphology upon interaction with an external stimulus to alter said optical article from the pre-activated state to the activated state of functionality, wherein said material capable of undergoing a morphological transformation comprises a phase change material, a phase separation material, or a phase mixing material, wherein said material capable of undergoing a morphological transformation comprises a blend of materials having a first miscibility representative of said first morphology and a second miscibility representative of said second morphology, and wherein said blend of materials comprise a blend of a polymer and polymerizable materials, a blend of a polymer and crosslinkable materials, a blend of a polymer blend and polymerizable materials, or a blend of a polymer blend and crosslinkable materials.

2. The optical article of claim 1, wherein said material capable of undergoing a morphological transformation serves to render an optical state change, wherein said optical state change comprises at least one of reflection efficiency, single layer reflectivity, dual layer reflectivity, refractive index, birefringence, polarization, scattering, absorbance, transparency, or optical path length.

3. The optical article of claim 1, wherein said pre-activated state is characterized by an optical reflectivity of at least a portion of the optical article being less than about 45 percent, and said activated state being characterized by an optical reflectivity of the same portion of the optical article being more than about 45 percent.

4. The optical article of claim 1 wherein a change in optical reflectivity of at least a portion of said optical article in said pre-activated state and said activated state is at least about 10 percent.

5. The optical article of claim 1, wherein said optical article comprises a CD, a DVD, a HD-DVD, a high definition optical recording media, a near field optical storage disc, or a holographic storage medium.

6. The optical article of claim 1, wherein said polymer blend comprises an Upper Critical Solution Temperature polymer blend, a Lower Critical Solution Temperature polymer blend, or a Close Loop Miscibility polymer blend.

7. The optical article of claim 6, wherein said Upper Critical Solution Temperature polymer blend comprises polystyrene with one or more of a styrene-butadiene-styrene, poly(methyl phenyl siloxane), polyisoprene and poly(4-methyl styrene), or polymethyl methacrylate with poly(n-butyl methacrylate) or poly(isobutyl methacrylate).

8. The optical article of claim 6, wherein said Lower Critical Solution Temperature polymer blend comprises a combination of polystyrene and poly (vinyl methyl ether), or polymethyl methacrylate and poly(styrene-co-maleic anhydride).

9. The optical article of claim 6, wherein said Close Loop Miscibility polymer blend comprises polymethyl methacrylate, polyethylene oxide, and poly(hydroxyl ether of bisphenol-A).

10. The optical article of claim 1, wherein said material capable of undergoing a morphological transformation further comprises a block copolymer, a polycarbonate, a polyacrylate, a polystyrene, a polyester, a polyethylene, a polypropylene, or liquid crystalline polymers.

11. The optical article of claim 1, wherein said material further comprises a block copolymer.

12. The optical article of claim 11, wherein said block copolymer comprises polystyrene-polyisoprene, polystyrene-poly(methyl methacrylate), polystyrene-poly(dimethyl siloxane), polystyrene-poly(vinyl pyridine), styrene-butadiene-styrene, polystyrene-n-pentyl methacrylate styrene-isoprene-styrene block copolymers, or combinations thereof.

13. The optical article of claim 1, wherein said material capable of undergoing a morphological transformation is disposed in a discrete area of said optical article, a continuous layer extending across a portion of the optical article, or a patterned layer extending across a portion of the optical article.

14. The optical article of claim 1, wherein said polymerizable or crosslinkable materials comprise oligoether, monomer acrylates, methacrylate, epoxy acrylate, aliphatic, aromatic urethane acrylates, polyester acrylates, or combinations of two or more thereof.

15. The optical article of claim 1, wherein at least a portion of said optical data layer comprises a tailored menu, wherein said tailored menu renders the optical article un-readable in said pre-activated state of functionality.

16. The optical article of claim 1, wherein said external stimulus comprises a laser, a thermal energy, infrared rays, X-rays, gamma rays, microwaves, visible light, ultra violet light, ultrasound waves, radio frequency waves, electrical energy, chemical energy, magnetic energy, mechanical energy, or a combination of two or more thereof.

17. The optical article of claim 1, further comprising a wirelessly powered flexible tag, wherein the tag is removably coupled to the optical article.

18. The optical article of claim 17, wherein said tag is configured to interact with said external stimulus.

19. The optical article of claim 18, wherein said tag comprises an adhesive coupling layer.

20. The optical article of claim 19, wherein said adhesive coupling layer comprises a pressure-sensitive adhesive, a water soluble adhesive, an acrylate-based adhesive, a silicone-based adhesive, an elastomer-based adhesive, an epoxy-based adhesive, a thermoset adhesive, an acrylate-based adhesive, or any combination thereof.

21. The optical article of claim 20, wherein said adhesive coupling layer comprises a patterned surface.

22. The optical article of claim 21, wherein said tag further comprises electrical circuitry.

23. The optical article of claim 22, wherein said electrical circuitry comprises radio frequency circuitry.

24. The optical article of claim 23, wherein said electrical circuitry further comprises a thermocouple, a light-emitting diode, a strain gauge, a sound detecting element, a diode, an antenna, a dipole, an electrical receiver, a photocell, a resistor, a capacitor, a rectifier, an integrated circuit, a surface mount resistor, a chip resistor, an electrode, a heating element, or any combination or multiple thereof.

25. The optical article of claim 24, wherein said heating element comprises titanium, copper, nickel, gold, tantalum-nitride, aluminum, molybdenum, titanium-tungsten, chrome, platinum, nichrome, indium tin oxide or any combination or alloy thereof.

* * * * *